United States Patent Office 3,515,708
Patented June 2, 1970

3,515,708
PROTECTING DOGS AGAINST *BRUCELLA CANIS* BACTEREMIA WITH KILLED *BRUCELLA ABORTUS* STRAIN 45/20 VACCINE
James M. Williams, St. Joseph, Mo., assignor to Philips Roxane Inc., St. Joseph, Mo., a corporation of Delaware
No Drawing. Filed Feb. 23, 1968, Ser. No. 707,432
Int. Cl. C12k *3/00*; A61k *23/00*
U.S. Cl. 424—92         3 Claims

ABSTRACT OF THE DISCLOSURE

This invention relates to a method of protecting animals which comprises administering to a non-bovine animal susceptible to natural attack by a pathogenic Brucella organism a small but effective amount of inactivated bovine *Brucella abortus* strain 45/20.

---

Recently an abnormal increase in perinatal mortality rates in domestic animals has been reported. Investigation of these mortalities appears to have resulted in the identification of certain pathogenic organisms as the causal agent. The pathogenic organisms attack susceptible animals causing infectious disease, which results in spontaneous abortion, stillbirth or neonatal death of the offspring involved.

The specific pathogens which have been found to cause this infectious disease appear to be bacterium of the genus Brucella. In particular, in the case of dogs, the investigations of workers in this field have resulted in the identification of the specific causal organism as *Brucella canis*. In the September 1967 issue of the Report of the Veterinary Virus Research Institute of Cornell University, the general characteristics of this infectious disease of dogs is discussed. This infectious Brucellosis disease of dogs manifests itself by the spontaneous abortion of a pregnant bitch, usually between the 30th and 57th day of gestation. However, the disease also causes early embryonic deaths which can occur between the 10th and 35th day after a successful mating. In males, the disease also causes epididymitis, in addition to the occasional occurrence of testicular degeneration and atrophy. Until the present time there has been no adequate treatment and control consists solely of the removal and destruction of infected animals, as determined by serological diagnoses.

In addition, in the case of sheep, there has been noted a high incidence of perinatal mortality caused by a pathogen of the genus Brucella. This organism, identified as *Brucella ovis* causes an infection of sheep which is characterized in the ram by epididymitis, orchitis and impaired fertility; in the ewe by placentitis and abortion; and in the lamb by septicemia and perinatal mortality. Heretofore, this disease has been effectively controlled only by removing and destroying the infected animals.

It has now been discovered that non-bovine domestic animals susceptible to attack by a virulent bacterium of the genus Brucella can be protected from this organism by administering to said animal a small but effective amount of a vaccine comprised of killed *Brucella abortus* strain 45/20. Preferably, it has been found that a non-bovine domestic animal susceptible to attack by a naturally occurring virulent bacterium selected from the group consisting of *Brucella canis* and *Brucella ovis* can be protected therefrom by the administration of a small but effective amount of a vaccine comprised of *Brucella abortus* strain 45/20. Most preferably, it has been discovered that dogs susceptible to natural attack by virulent *Brucella canis* can be protected therefrom by the administration of a small but effective amount of a vaccine comprised of killed *Brucella abortus* strain 45/20.

In the case of dogs the pathogenic organism *Brucella canis* has been found to have the following characteristics:

Morphology.—Gram-negative, small, rod-shaped cells 0.5 by 0.5 to 2 microns. Fresh isolates tend to be more coccoid. In stained preparations, the organisms occurs singly, in pairs, in groups and occasionally in short chains. Microcapsule is present. Organism is non-motile. Fresh isolates of the organism tend to partially retain gram stain.

Cultural.—The organism is aerobic. The optimal culture temperature is 37° C. When cultured on tryptose agar, small colonies are visible in 36 hours. Maximum colony size is reached in 48–72 hours of incubation. On agar, the colonies are grayish-white moist, glistening and translucent exhibiting a blue-green opalescence by obliquely transmitted sunlight. Growth is mucoid. Colonies tend to adhere to agar surfaces. Colonies are about 1.0 to 1.5 mm. at maturity, with "dwarf" colonies common on primary isolation. In broth, moderate turbidity occurs in 48 hours. Ropy sediment appears after several days' growth. No pellicle is formed with fresh isolates.

Biochemical:
    Carbohydrate fermentation (17 sugars,
        alcohols) _____ —
    Citrate utilization _____ —
    Urease production _____ ++++
    Catalase production _____ ++++
    Oxidase (1% dimethyl-paraphenylene-
        diamine) _____ +
    H2S production (tryptose media) ____ ± (1 week)
    Nitrate reduction _____ +
    Mr-VP _____ —
    Indole _____ —
    Gelation liquification _____ —
    Growth on MacConkey's medium (primary isolation) _____ —
    Growth on medium containing—
        Basic Fuchsin
            1:50,000 _____ —
            1:100,000 _____ +++
        Thionine
            1:25,000 _____ ++
            1:50,000 _____ ++++

Phage sensitivity.—No effect of brucellaphage at RTD or $10^4$ RTD.

Serological relationships.—Antigenic relationships demonstrated between *Brucella canis* and other Brucella species: Seriological reactions are often one-sided, with occasional reciprocal cross-reactions. Antiserums from infected dogs did *not* react with *Brucella abortus* tube or plate antigens.

The vaccine which may be employed in the practice of this invention is comprised of inactivated *Brucella abortus* strain 45/20. More particularly, the vaccine which may be employed herein is comprised of concentrated inactivated bovine *Brucella abortus* strain 45/20. For practical purposes, the concentrated inactivated bovine *Brucella abortus* strain 45/20 may be employed directly or it may be incorporated in a parenterally acceptable pharmaceutical vehicle as is well known in the art. Among the vehicles into which the concentrated inactivated bovine *Brucella abortus* strain 45/20 may be incorporated may be included such parenteral vehicles as distilled water, vegetable oil, or a stable suspension of water in mineral oil. One of the vaccines which may be employed in the practice of this invention may be prepared as follows:

An ampoule containing living *Brucella abortus* strain 45/20 organisms dried by freezing (total number of organisms $5.0 \times 10^9$) had added to it 2 milliliters of tryptose physiological brine. Then 0.05 milliliter of the above-mentioned suspension was added to each of the twenty tubes filled with tryptose agar. The tubes were stored in air for 2 days, with shaking, at 37° C. Each tube had added to it 2 milliliters of a liquid medium of which 1 liter was of the following composition: 1000 milliliters of water, 30 grams of proteose peptone "Difco," 30 grams of glucose, 10 grams of vitamin B complex in the form of yeast extract, 2.004 grams of secondary sodium phosphate ($Na_2HPO_4 \cdot 2H_2O$).

Shaking flasks each containing 200 milliliters of the liquid medium mentioned in the preceding paragraph were inoculated with cultures thus obtained. The flasks were aerated at 37° C. for 2 days. The contents of each flask were subsequently divided into ten equal portions and each portion added to a shaking flask containing 200 milliliters of the liquid medium previously referred to.

Each flask was aerated at 37° C. for 3 days. The number of organisms per milliliter was counted at the end of the third day and was on the average $150 \times 10^9$. In other words the factor of increase was 6 (initial concentrations of the organisms was $25 \times 10^9$ per milliliter). The number of live organisms per milliliter in the cultures was about $75 \times 10^9$. Subsequently the bacteria were killed by heating the cultures at 60° C. for 2 hours. The liquid was centrifuged, the clear liquid discarded and the centrifugate resuspended in water to which merthiolate in a ratio of 1:10,000 had been added. The final concentration of organisms in the resulting vaccine was $400 \times 10^9$ per milliliter.

In order to prepare an emulsion of the vaccine in a stable suspension of water in mineral oil, if desired, 55 ml. of the vaccine obtained as hereinabove described were homogenized dropwise with stirring and under sterile conditions in a mixture composed of 40 cc. of vaccine oil (sold under the trade name, "Bayol F," viscosity 9 cps. at 37.7° C., boiling range 314–357° C.), 4.7 cc. of mannitol and 0.3 cc. of polyoxyethylated castor oil containing approximately 40 moles of ethylene oxide per mole of castor oil. The resulting emulsion was stored at 40° C. for four months and was still stable without evidence of any separation of oil.

The non-bovine domestic animals which may be treated in accordance with this invention may include such animals as dogs and sheep. The animals to be treated should be susceptible to natural attack from the virulent organism against which the animal is to be protected, prior to administration of the Brucella abortus strain 45/20 vaccine. The vaccine should be administered to the animal by parenteral route and preferably intramuscularly.

It has been found that the satisfactory results of the instant invention are obtained when a small but effective amount of the inactivated bovine Brucella abortus strain 45/20 vaccine of the instant invention is administered to the animal sought to be treated hereunder. More particularly, satisfactory results may be obtained when from 0.5 to about 3.0 cc. of the Brucella abortus strain 45/20 vaccine is administered. Satisfactory results have been obtained when the vaccine employed contains from about $25 \times 10^9$ to $300 \times 10^9$ organisms per ml. Most preferable results have been obtained when from 0.5 to about 1.5 cc. of the Brucella abortus strain 45/20 vaccine containing from about $75 \times 10^9$ to $125 \times 10^9$ organisms per ml. are administered in each of two separate inoculations about one to two weeks apart. Within about 7 to 14 days after the last inoculation, the treated animal will be protected from attack by the virulent organism here protected against.

In addition to the foregoing, it is possible to combine the bovine Brucella abortus strain 45/20 vaccine of the instant invention with other vaccines, e.g. canine distemper etc., to simultaneously protect the treated animal against a multitude of disease.

The invention may be illustrated by the following example:

EXAMPLE 1

A group of dogs was serologically tested to determine susceptibility to attack by virulent Brucella canis. A group of sixteen susceptible dogs was obtained. Four of the dogs were selected as vaccinates and the remaining twelve were held in isolation and kept as controls. The four vaccinates were inoculated by intramuscular injection, with two doses of one cc. each of a Brucella abortus strain 45/20 vaccine containing approximately $100 \times 10^9$ organisms per cc. at two week intervals. Serological tests performed after inoculation revealed low agglutinating antibody. About 14 days after the second inoculation all sixteen dogs i.e. vaccinates and controls, were challenged by oral administration of virulent Brucella canis, about $8 \times 10^8$ organisms. No bacteremia developed in any of the vaccinated dogs ten days after challenge. All control dogs developed bacteremia within ten days after challenge and Brucella canis bacteria could be isolated from control dog blood samples three months subsequent to challenge. The vaccinates remained serologically negative six to eight weeks after challenge.

The invention may be variously otherwise embodied within the scope of the appended claims.

What is claimed is:
1. The method of developing low agglutinating antibody sufficient, within about 7 to 14 days after the last inoculation, to protect otherwise susceptible dogs against bacteremia caused by virulent Brucella canis, which consists of the steps of parenterally administering to each dog two doses of one cc. each of killed Brucella abortus strain 45/20 vaccine containing from about $75 \times 10^9$ to about $125 \times 10^9$ organisms per cc., at two week intervals.

2. The method of claim 1 wherein the vaccine contains $100 \times 10^9$ organisms per cc.

3. The method of claim 1 wherein the vaccine is administered by intramuscular injection.

References Cited

Hagan et al., "The Infectious Diseases of Domestic Animals," 4th ed. (1961), Comstock Publ. Co., Ithaca, N.Y., pp. iii, 257, 270–276, 279, 282, 290 (posl. No. SF781H3 1961).

Vet. Bull. 30, No. 640, No. 643, No. 3514 (1960).

Vet. Bull. 31, No. 2858 (1961).

Vet. Bull. 32, No. 1385, No. 1781, No. 3692, No. 4055 (1962).

Vet. Bull. 33, No. 445, No. 1097, No. 2264–5, No. 3076 (1963).

Vet. Bull. 34, No. 447, No. 1190 (1964).

Vet. Bull. 36, No. 3783, No. 3796, No. 4217 (1966).

Vet. Bull. 37, No. 1126 (1967).

SHEP K. ROSE, Primary Examiner